(12) United States Patent
Crosby et al.

(10) Patent No.: US 9,267,523 B2
(45) Date of Patent: Feb. 23, 2016

(54) METHOD FOR MOUNTING ULTRASONIC SENSORS

(71) Applicant: General Electric Company, Schenectady, NY (US)

(72) Inventors: Jonathan Charles Crosby, Louisville, KY (US); William John Weigel, Louisville, KY (US)

(73) Assignee: General Electric Company, Schenectady, NY (US)

( * ) Notice: Subject to any disclaimer, the term of this patent is extended or adjusted under 35 U.S.C. 154(b) by 343 days.

(21) Appl. No.: 13/735,238

(22) Filed: Jan. 7, 2013

(65) Prior Publication Data

US 2014/0190281 A1    Jul. 10, 2014

(51) Int. Cl.
*G01D 11/30* (2006.01)
*F16B 17/00* (2006.01)

(52) U.S. Cl.
CPC ............... *F16B 17/00* (2013.01); *G01D 11/30* (2013.01); *Y10T 403/52* (2015.01)

(58) Field of Classification Search
CPC .......... F16B 17/00; G01D 11/30; G01D 5/48; Y10T 403/52; F25D 2700/06; G10K 11/004; G01C 9/00

USPC ........................................................ 73/866.5
See application file for complete search history.

(56) References Cited

U.S. PATENT DOCUMENTS

| | | | | |
|---|---|---|---|---|
| 4,572,253 | A * | 2/1986 | Farmer et al. | 141/95 |
| 4,890,651 | A * | 1/1990 | Stembridge et al. | 141/1 |
| 4,918,672 | A * | 4/1990 | Iwabuchi et al. | 367/99 |
| 4,944,335 | A * | 7/1990 | Stembridge et al. | 141/95 |
| 4,994,800 | A * | 2/1991 | Milliken | 340/901 |
| 5,515,733 | A | 5/1996 | Lynnworth | |
| 6,085,592 | A * | 7/2000 | Kawashima | 73/632 |
| 6,862,935 | B2 * | 3/2005 | Fukuda et al. | 73/602 |
| 7,021,144 | B2 * | 4/2006 | Fukuda et al. | 73/632 |
| 7,673,661 | B2 * | 3/2010 | Chase et al. | 141/360 |
| 8,353,321 | B2 * | 1/2013 | Agam et al. | 141/198 |
| 2004/0060357 | A1 * | 4/2004 | Fukuda et al. | 73/602 |
| 2008/0156008 | A1 * | 7/2008 | Richmond et al. | 62/178 |

* cited by examiner

*Primary Examiner* — Freddie Kirkland, III
(74) *Attorney, Agent, or Firm* — Dority & Manning, P.A.

(57) ABSTRACT

An improved sensor assembly is provided that allows for close proximity detection of one or more objects by isolating a first sensor from a second sensor within the sensor assembly using isolation boots and a unique mounting structure. Each sensor has at least a portion positioned within an isolation boot, and the isolation boots are supported between a base plate and a support plate by one or more base plate ribs and one or more support plate ribs. The sensor is therefore prevented from otherwise contacting the base plate or the support plate.

20 Claims, 9 Drawing Sheets

METHOD FOR MOUNTING ULTRASONIC SENSORS

FIELD OF THE INVENTION

The subject matter of the present disclosure relates generally to an improved method for mounting a pair of ultrasonic sensors that can sense one or more objects within close proximity.

BACKGROUND OF THE INVENTION

Ultrasonic sensors have a wide variety of forms and function. One such form is an ultrasonic transducer, which is capable of converting an electric current into high frequency sound waves. Another form is an ultrasonic detector, which is capable of detecting high frequency sound waves and converting them into an electric signal. An ultrasonic transducer and ultrasonic detector may be used in combination with a processing device to detect the proximity of one or more objects. Specifically, one ultrasonic transducer may be configured for generating high frequency sound waves and directing them in a specific direction, while an ultrasonic detector may be configured for detecting any high frequency sound waves reflected back towards the sensors by one or more objects in proximity to the sensors. The distance of one or more objects may be determined by the amount of time between when the ultrasonic transducer sends out an ultrasonic sound wave, and when the ultrasonic detector detects a reflection of that sound waive.

Traditionally, such a combination of sensors has been employed by securing the sensors to a housing structure using a hot melt adhesive or a silicone potting compound. The housing structure could then be mounted in a variety of locations to detect the proximity of objects. Certain problems exist with this construction, however. Specifically, such construction may allow a prohibitive amount of ultrasonic signals, e.g., in the form of vibrations, to be transmitted through the housing from the ultrasonic transducer directly to the ultrasonic detector, without the ultrasonic signal first being reflected off a target. This is also referred to as crosstalk. Crosstalk may prevent the ultrasonic sensors' ability to detect the proximity of one or more objects within a close proximity of the sensor assembly.

As such, an ultrasonic sensor assembly that has one or more features that can improve the sensor's ability to detect one or more objects within a close proximity would be useful. More specifically, an ultrasonic sensor assembly that can reduce the amount of crosstalk between two sensors would be beneficial. Such an assembly that can reduce or eliminate crosstalk while positioning the two sensors in close proximity to each other would be particularly useful.

BRIEF DESCRIPTION OF THE INVENTION

The present disclosure provides an improved sensor assembly that allows for close proximity detection of one or more objects by isolating a first sensor from a second sensor within the sensor assembly using isolation boots and a unique mounting structure. Each sensor has at least a portion positioned within an isolation boot, and the isolation boots are supported between a base plate and a support plate by one or more base plate ribs and one or more support plate ribs. The sensor is therefore prevented from otherwise contacting the base plate or the support plate. Additional aspects and advantages of the invention will be set forth in part in the following description, or may be apparent from the description, or may be learned through practice of the invention.

In one exemplary embodiment, the present disclosure provides a sensor assembly including a base plate defining a first aperture and a first base plate rib surrounding and concentric with the first aperture, and a second aperture and a second base plate rib surrounding and concentric with the second aperture. The sensor assembly also includes a support plate attached to the base plate, the support plate including a first support plate rib, and a second support plate rib. Additionally, the sensor assembly includes a first sensor assembly including a first sensor and a first isolation boot. At least a portion of the first sensor is positioned within the first isolation boot, and the first isolation boot is supported between the first base plate rib and the first support plate rib such that the first sensor is isolated from contact with the base plate and the support plate. The sensor assembly further includes a second sensor assembly positioned adjacent to the first sensor assembly and comprising a second sensor and a second isolation boot. At least a portion of the second sensor is positioned within the second isolation boot, the second isolation boot is supported between the second base plate rib and the second support plate rib such that the second sensor is isolated from contact with the base plate and the support plate.

In another exemplary embodiment, the present disclosure provides a sensor assembly for use in a refrigerator appliance, including a base plate defining a first aperture and a first base plate rib surrounding and concentric with the first aperture, and a second aperture and a second base plate rib surrounding and concentric with the second aperture. The sensor assembly also includes a support plate attached to the base plate, the support plate including a first support plate rib, and a second support plate rib. Additionally, the sensor assembly includes a first sensor assembly including a first sensor and a first isolation boot. At least a portion of the first sensor is positioned within the first isolation boot, and the first isolation boot is supported between the first base plate rib and the first support plate rib such that the first sensor is isolated from contact with the base plate and the support plate. The sensor assembly further includes a second sensor assembly positioned adjacent to the first sensor assembly and comprising a second sensor and a second isolation boot. At least a portion of the second sensor is positioned within the second isolation boot, the second isolation boot is supported between the second base plate rib and the second support plate rib such that the second sensor is isolated from contact with the base plate and the support plate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION OF THE INVENTION

Figure 1:
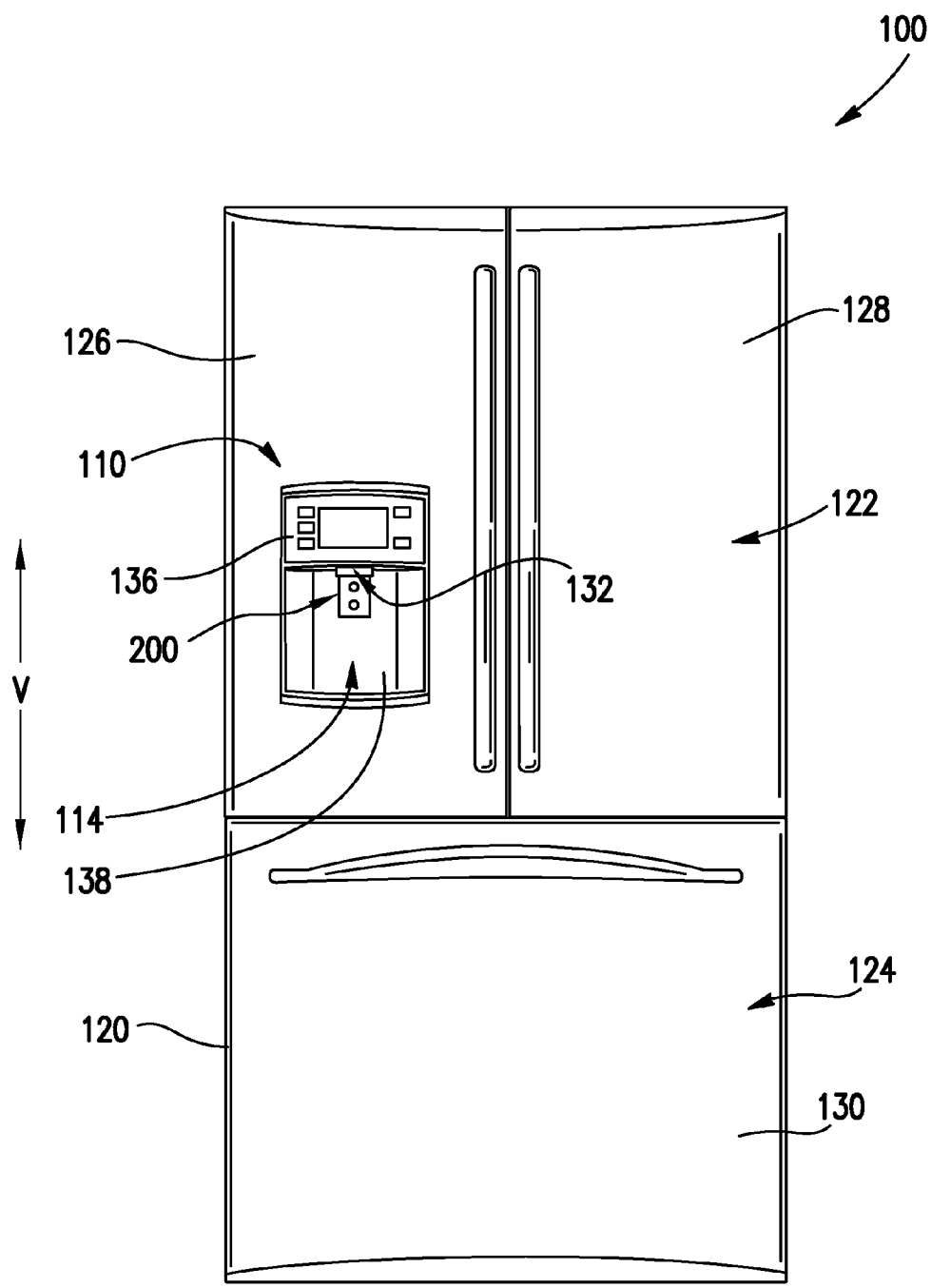
FIG. 1 provides a front view of an exemplary embodiment of a refrigerator appliance of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
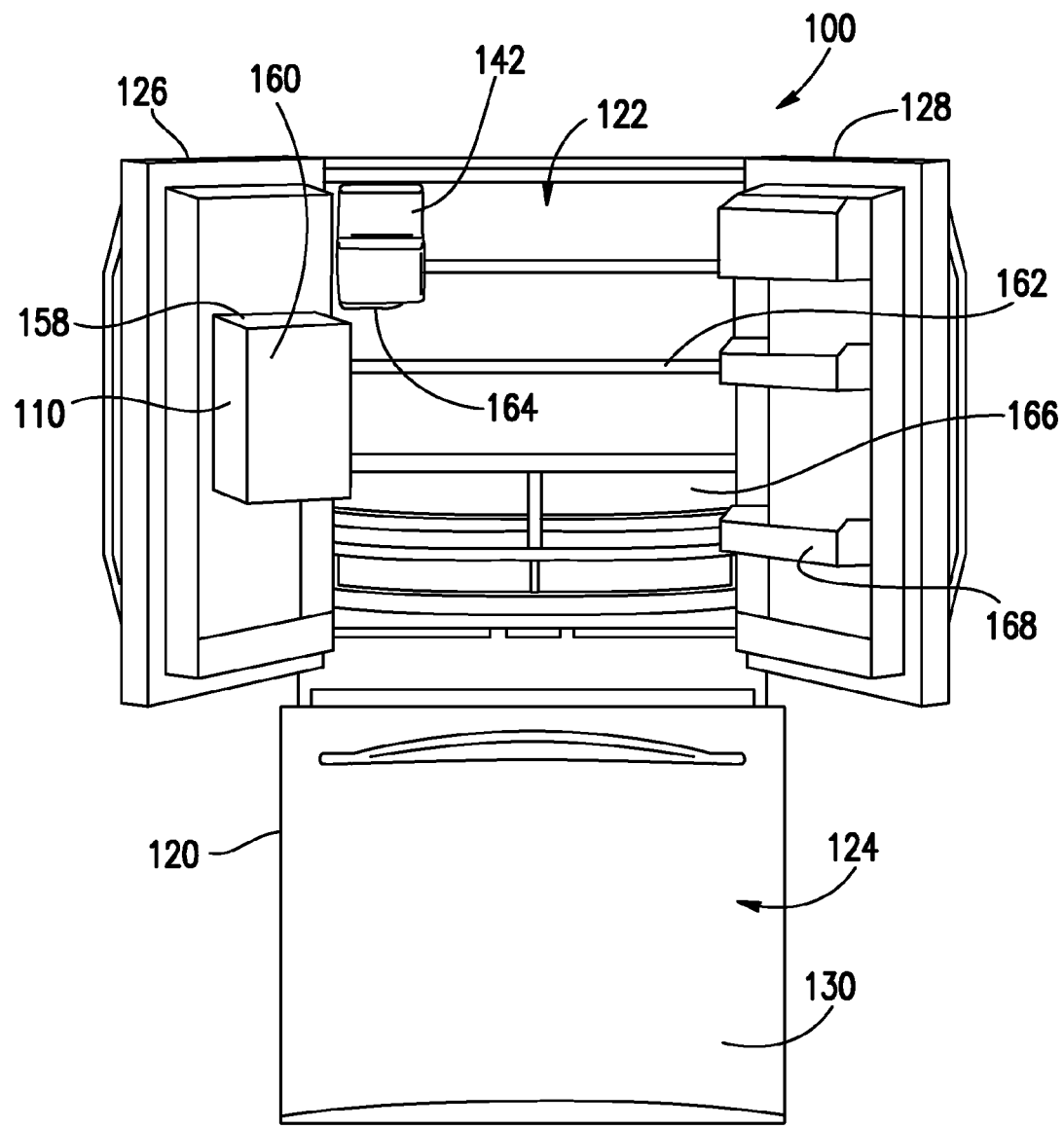
FIG. 2 provides a front view of an exemplary embodiment of a refrigerator appliance of the present disclosure with its doors open.
Figure 3:
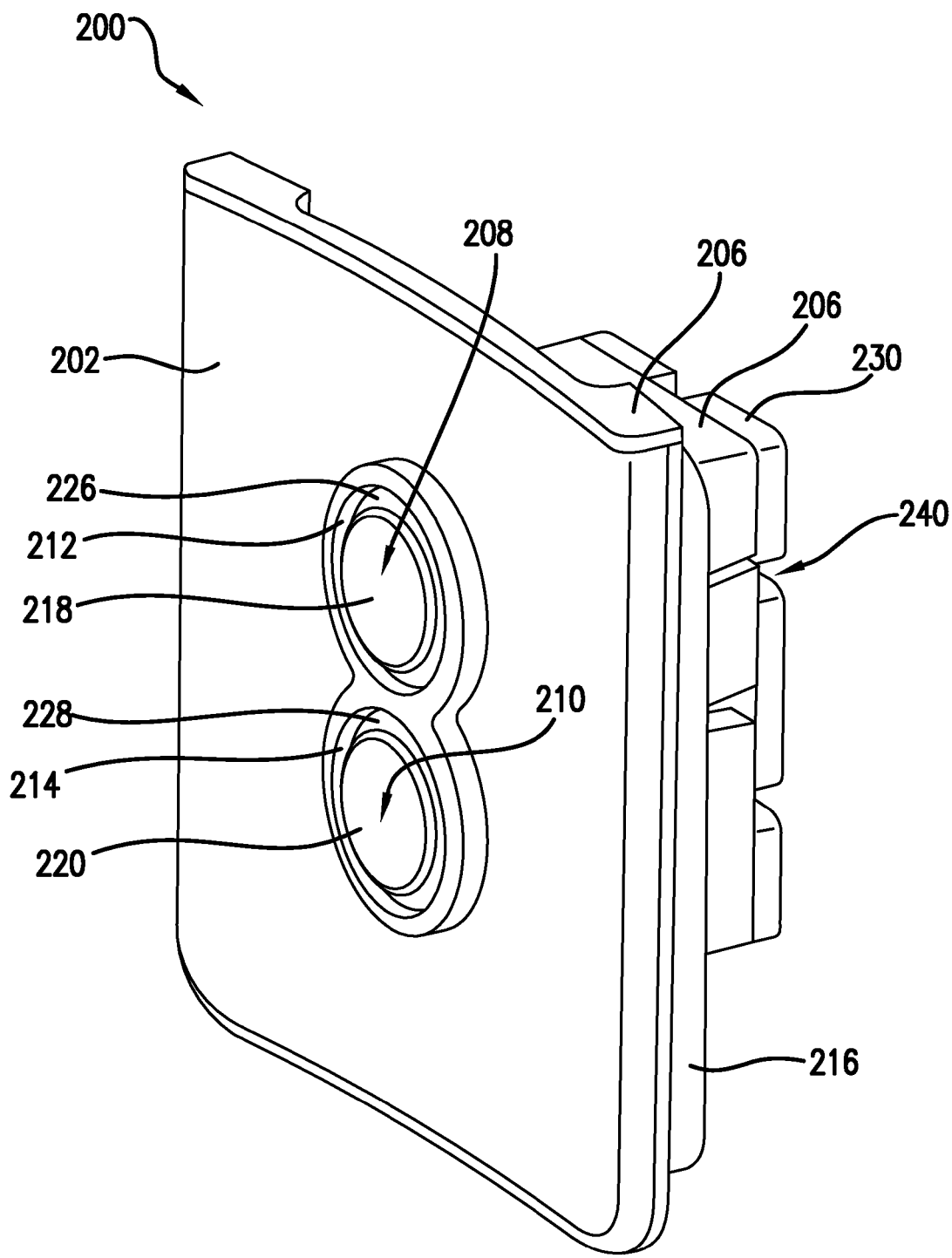
FIG. 3 provides a perspective view of an exemplary embodiment of a sensor assembly of the present disclosure.

FIGS. 1 and 2 provide a front view of an exemplary embodiment of a refrigerator 100 including a sensor assembly 200 of the present disclosure. Refrigerator 100 includes a housing 120 defining an upper fresh food compartment 122 and a lower freezer compartment 124 arranged at the bottom of refrigerator 100. As such, refrigerator 100 is generally referred to as a bottom mount refrigerator. It is recognized, however, that the benefits of the present disclosure apply to other types and styles of refrigerators such as, for example, a top mount refrigerator or a side-by-side style refrigerator. Consequently, the description set forth herein is for illustrative purposes only and is not intended to be limiting in any aspect to a particular refrigerator compartment configuration. Additionally, the present invention may be used with other types of appliances as well as applications other than in appliances.

As may be seen in FIG. 1, refrigerator doors 126, 128 are rotatably hinged to an edge of the housing 120 for selectively accessing the fresh food compartment 122. In addition, a freezer door 130 is arranged below refrigerator doors 126, 128 for selectively accessing freezer compartment 124. Freezer door 130 is coupled to a freezer drawer (not shown) slidably coupled within freezer compartment 124. In FIG. 1, the refrigerator doors 126, 128 and freezer door 130 are shown in a closed configuration.

Refrigerator 100 also includes a dispenser assembly 110 for dispensing, e.g., ice and water. As shown in FIG. 1, dispenser assembly 110 includes a dispenser 114, which includes a discharging outlet 132 for accessing ice and water. A control panel 136 is provided for controlling the mode of operation. For example, the control panel 136 may include a water dispensing mode button (not labeled) and an ice-dispensing mode button (not labeled) for selecting a desired mode of operation. Dispenser 114 employs a sensor assembly 200, as will be discussed in detail with reference to FIGS. 3 through 9, below, to determine whether a cup or other container is present for purposes of dispensing, e.g., water or ice.

Discharging outlet 132 and sensor assembly 200 are external parts of dispenser assembly 110, and are mounted in a dispenser recess 138 defined in an outside surface of refrigerator door 126. Dispenser recess 138 is positioned at a predetermined elevation convenient for a user to access ice or water. This enables the user to access ice or water without the need to bend-over and without the need to access freezer compartment 124. In the exemplary embodiment, dispenser recess 138 is positioned at a level that approximates the chest level of a user.

FIG. 2 provides a front view of an exemplary embodiment of refrigerator 100 having refrigerator doors 126, 128 and freezer door 130 in an open configuration. As such, the various components of fresh food compartment 122 are shown. In this embodiment, dispenser assembly 110 further includes an ice storage compartment 142 having an ice dispenser outlet 164 and an ice maker (not shown). As ice storage compartment 142 is positioned in fresh food compartment 122, ice storage compartment 142 may contain insulated walls (not shown) so as to allow it to be kept at a temperature lower than that of fresh food compartment 122. A rear portion 160 of dispenser 114 is also shown with an ice chute 158. Ice chute 158 is configured to allow ice to flow through dispenser 114 to discharging outlet 132. Dispenser assembly 110 is configured such that when door 126 is in a closed position (as shown in FIG. 1), ice may travel from ice storage compartment 142, though dispenser outlet 164, through ice chute 158, and out of discharging outlet 132.

Using the teaching disclosed herein, one of skill in the art will understand that in alternative embodiments of the present disclosure, dispenser assembly 110 need not be positioned in fresh food compartment 122 and through refrigerator door 126. In alternative embodiments of the present disclosure, for example, dispenser assembly 110 may be positioned in a refrigerator appliance having, e.g., a side-by-side configuration. In such example, dispenser assembly 110 may be positioned in freezer compartment 124 and through freezer door 130. This configuration would eliminate the need for insulated walls on ice storage compartment 142.

As is also shown in FIG. 2, refrigerator 100 includes a plurality of storage shelves 168 positioned on refrigerator door 128, and one or more slide-out drawers 166 and shelves 162 are positioned within fresh food storage compartment 122. In alternative embodiments, however, different configurations of shelves 162, 168 and drawers 166 may be provided to facilitate the storage of items to be refrigerated.

As previously discussed, in one exemplary embodiment, dispenser 114 of dispenser assembly 110 in exemplary refrigerator 100 employs sensor assembly 200 to determine whether cups or other containers are within a predetermined proximity so as to have, e.g., ice or water dispensed therein. A perspective view of an exemplary embodiment of sensor assembly 200 is provided in FIG. 3. As shown, sensor assembly 200 is comprised generally of a base plate 206 (as will be discussed in detail with reference to FIGS. 4 through 6) and a support plate 230 (as will be discussed in detail with reference to FIG. 7), wherein support plate 230 is attached to base plate 206 and portions of each support a first sensor assembly 218 and a second sensor assembly 220 (as will be discussed in detail with reference to FIGS. 8 and 9). The exemplary embodiment of sensor assembly 200 shown in FIG. 3 also includes a gasket 216 and a face plate 202.

Figure 4:
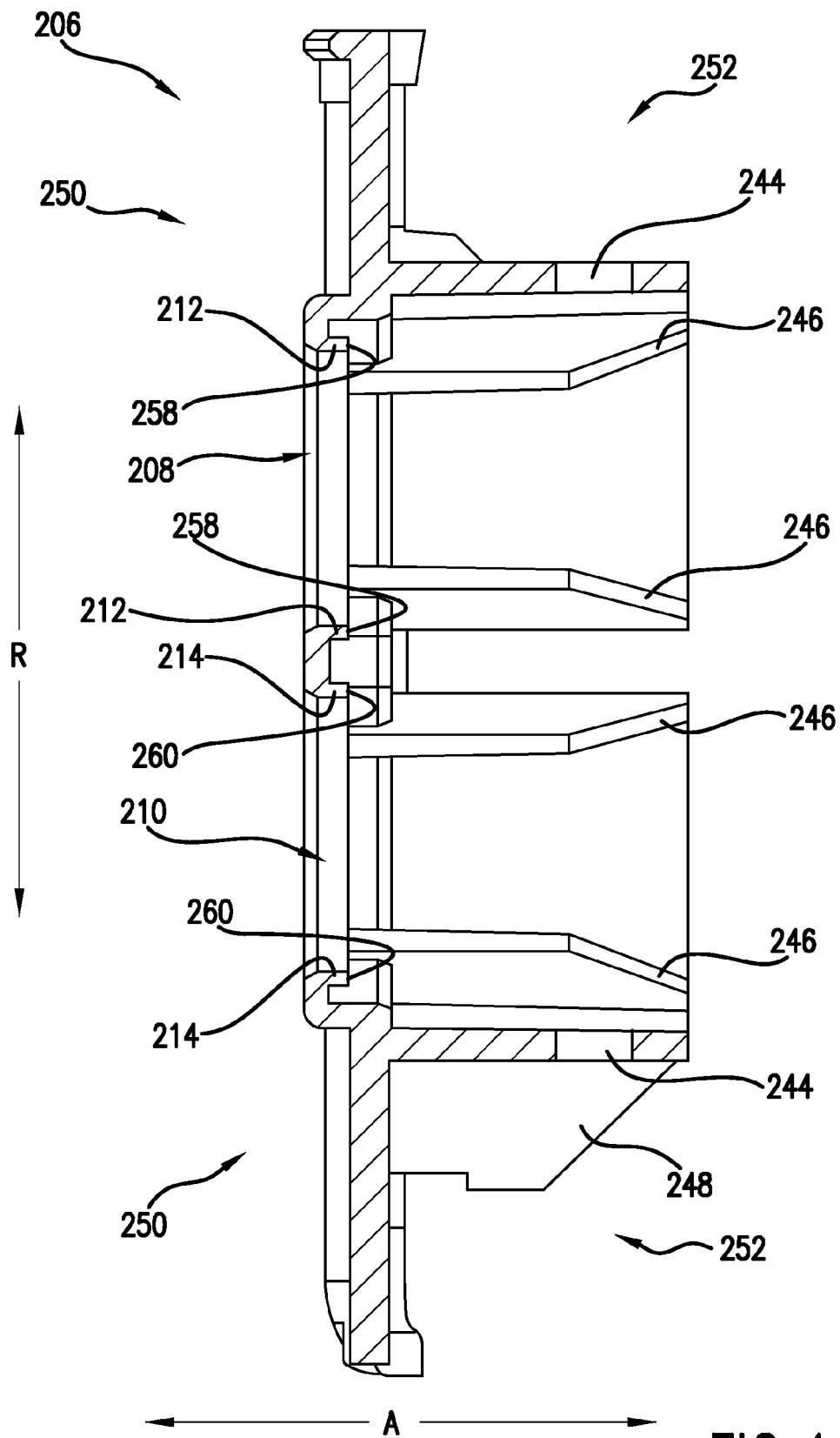
FIG. 4 provides a cross-sectional side view of an exemplary embodiment of a base plate of the present disclosure.
Figure 5:
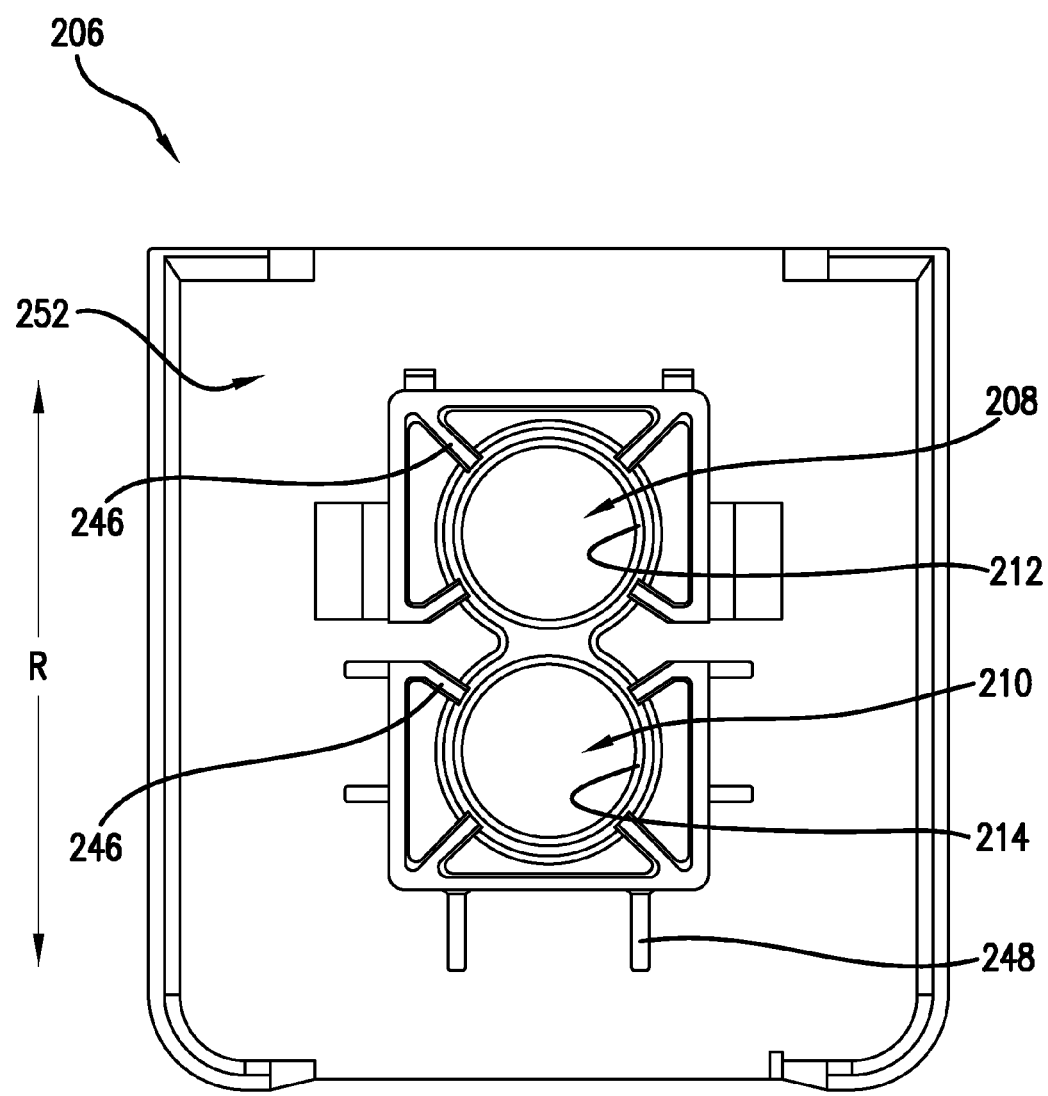
FIG. 5 provides a rear view of an exemplary embodiment of a base plate of the present disclosure.

FIGS. 4 and 5 provide a cross-sectional side view and a rear view, respectively, of an exemplary embodiment of base plate 206 of the present disclosure. The exemplary embodiment of base plate 206 shown includes a first aperture 208 and a second aperture 210, along with a first base plate rib 212 and a second base plate rib 214. First base plate rib 212 surrounds and is concentric with first aperture 208, and second base plate rib 214 surrounds and is concentric with second aperture 210. In one exemplary embodiment, first base plate rib 212 forms a concentric circle with first aperture 208 and second base plate rib 214 forms a concentric circle with second aperture 210, as is shown in FIG. 5. First and second base plate ribs 212, 214 extend in an axial direction, A, from a front side 250 of base plate 206 towards a back side 252 of base plate 206, as shown in FIG. 4.

As shown for this exemplary embodiment, base plate 206 can have at least one support strut 248 to add strength and stability properties to sensor assembly 200. Additionally, first base plate rib 212 and second base plate rib 214 are each a single continuous rib, fully surrounding first aperture 208 and second aperture 210, respectively. However, the present invention includes other embodiments where ribs 212 and 214 do not completely surround the respective apertures 208 and 210.

Figure 6:
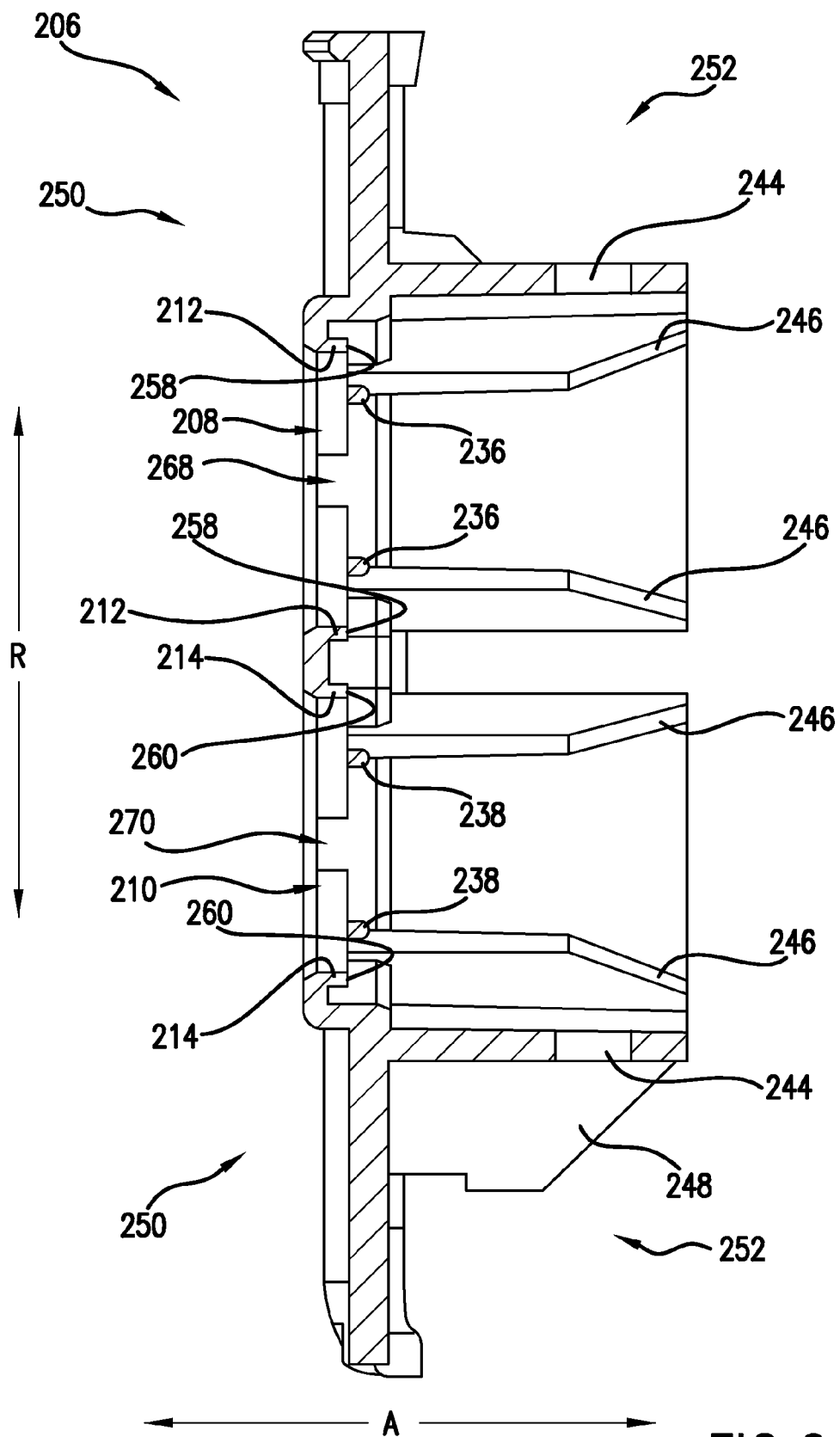
FIG. 6 provides a cross-sectional side view of another exemplary embodiment of a base plate of the present disclosure.

For example, FIG. 6 provides a cross-sectional side view of another exemplary embodiment of base plate 206. In this exemplary embodiment, first base plate rib 212 and second base plate rib 214 each comprise a plurality of ribs, wherein each rib in the plurality of ribs forming first base plate rib 212 defines a space 268 in between each adjacent rib. Further, each rib in the plurality of ribs forming second base plate rib 214 defines a space 270 in between each adjacent rib. As is also shown in the exemplary embodiment of FIG. 6, a first plurality of nubs 236 may extend from a distal end 258 of first base plate rib 212, and a second plurality of nubs 238 may extend from a distal end 260 of second base plate rib 214. Other aspects and advantages of the exemplary embodiments of base plate 206, provided in FIGS. 4 through 6, are discussed below with reference to FIGS. 8 and 9.

Figure 7:
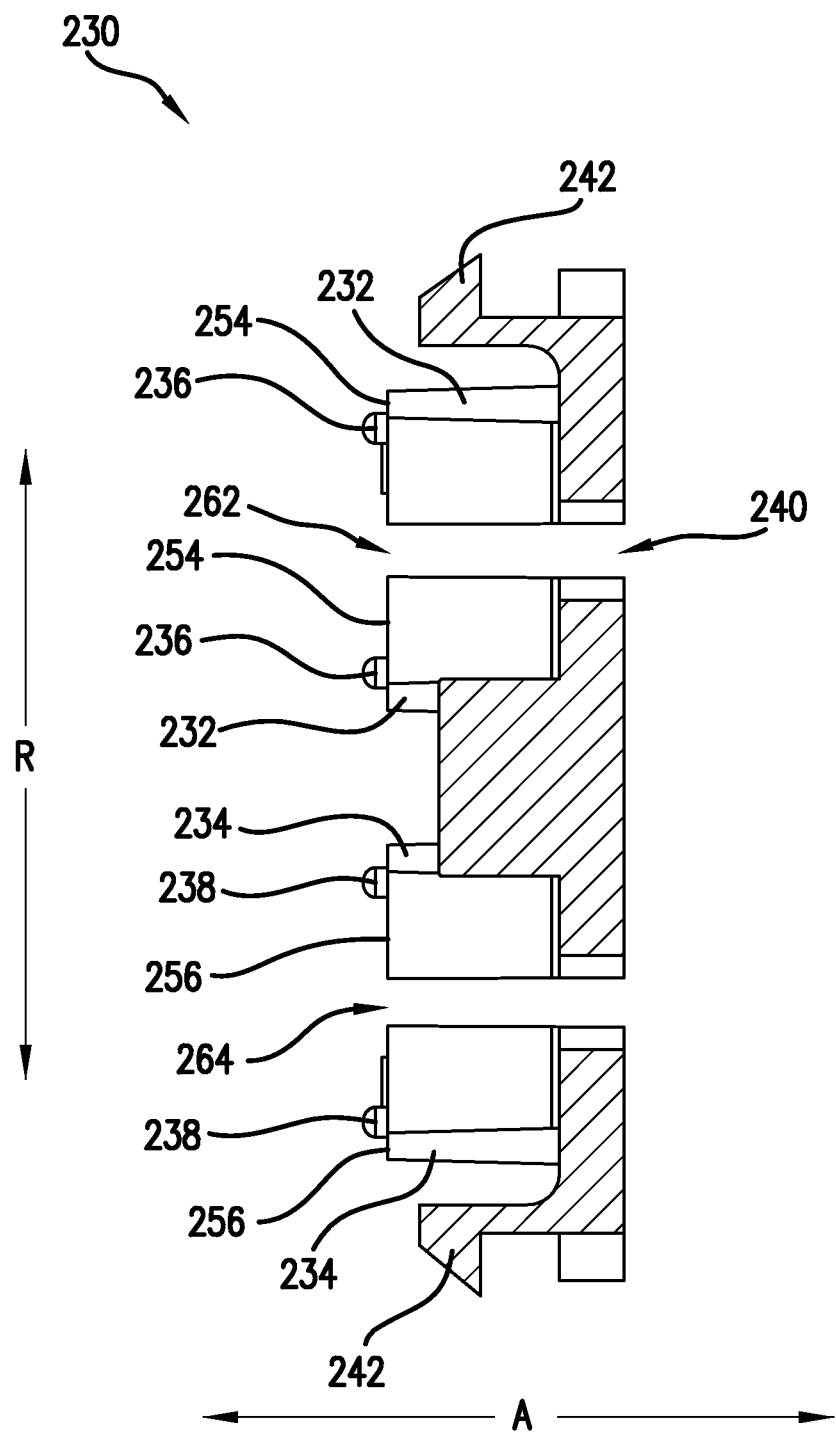
FIG. 7 provides a cross-sectional side view of an exemplary embodiment of a support plate of the present disclosure.

Referring now to FIG. 7, a cross-sectional side view of an exemplary embodiment of support plate 230 of the present disclosure is provided. Support plate 230 comprises a first support plate rib 232 and a second support plate rib 234, each extending in axial direction A. Extending from a distal end 254 of first support plate rib 232 is first plurality of nubs 236, and extending from a distal end 256 of second support plate rib 234 is second plurality of nubs 238. Nubs, however, can be placed on the support plate ribs 232, 234, base plate ribs 212, 214, or both. For example, as shown in FIGS. 6 and 7, for one exemplary embodiment, first plurality of nubs 236 extends from distal end 258 of first base plate rib 212, from distal end 254 of first support plate rib, or both. Additionally, second plurality of nubs 238 extends from distal end 260 of second base plate rib 214, from distal end 256 of second support plate rib, or both.

In another exemplary embodiment of support plate 230, first support plate rib 232 comprises a plurality of ribs extending in axial direction A instead of a single rib. Additionally, second support plate rib 234 comprises a plurality of ribs extending in axial direction A. Each rib in the plurality of ribs comprising first and second support plate ribs 232, 234 defines a space 262, 264, respectively, between each adjacent rib. Other aspects and advantages of the exemplary embodiment of support plate 230 provided in FIG. 7 are discussed below, with reference to FIGS. 8 and 9.

Figure 8:
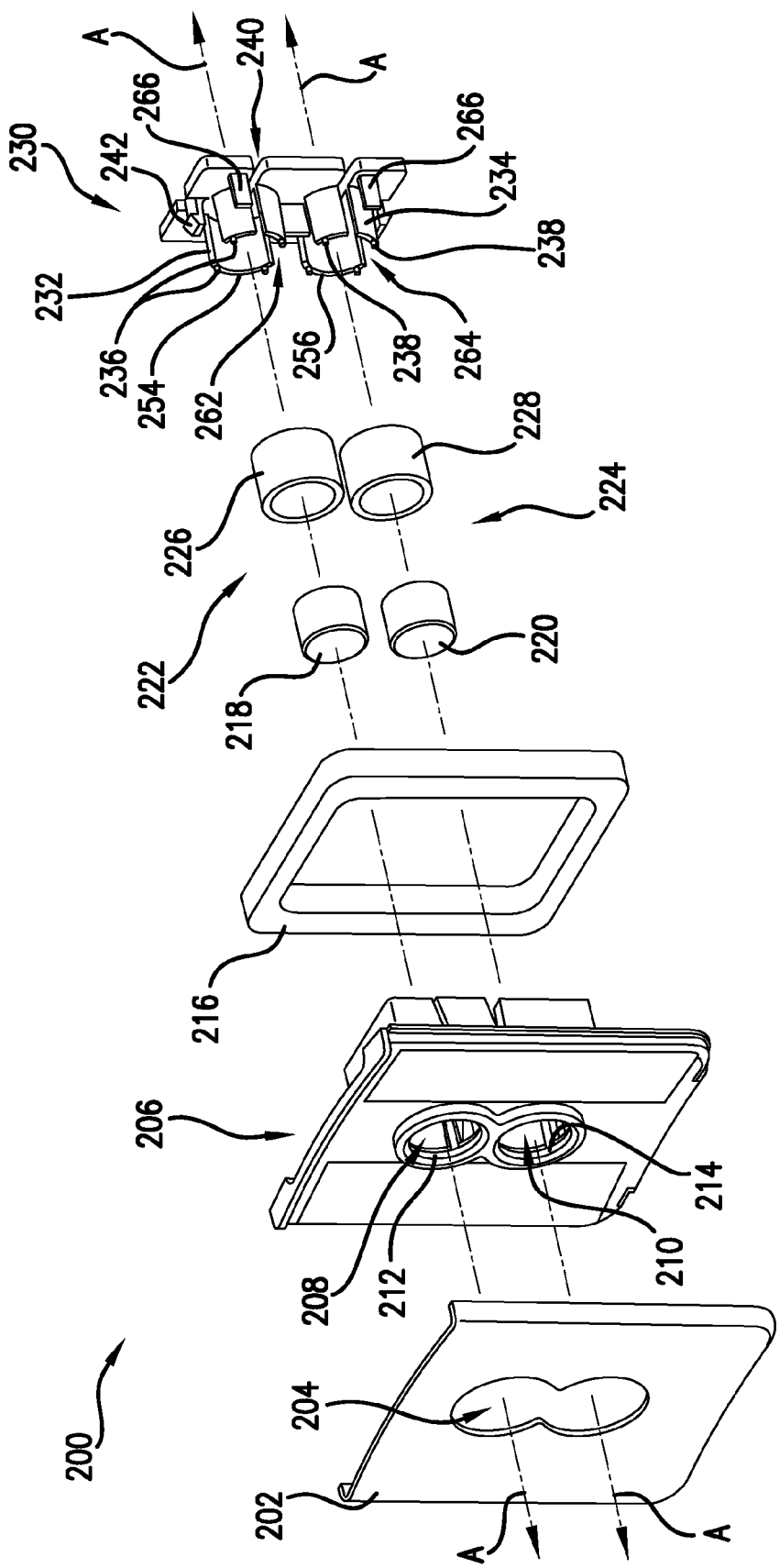
FIG. 8 provides an exploded perspective view of an exemplary embodiment of a sensor assembly of the present disclosure.
Figure 9:
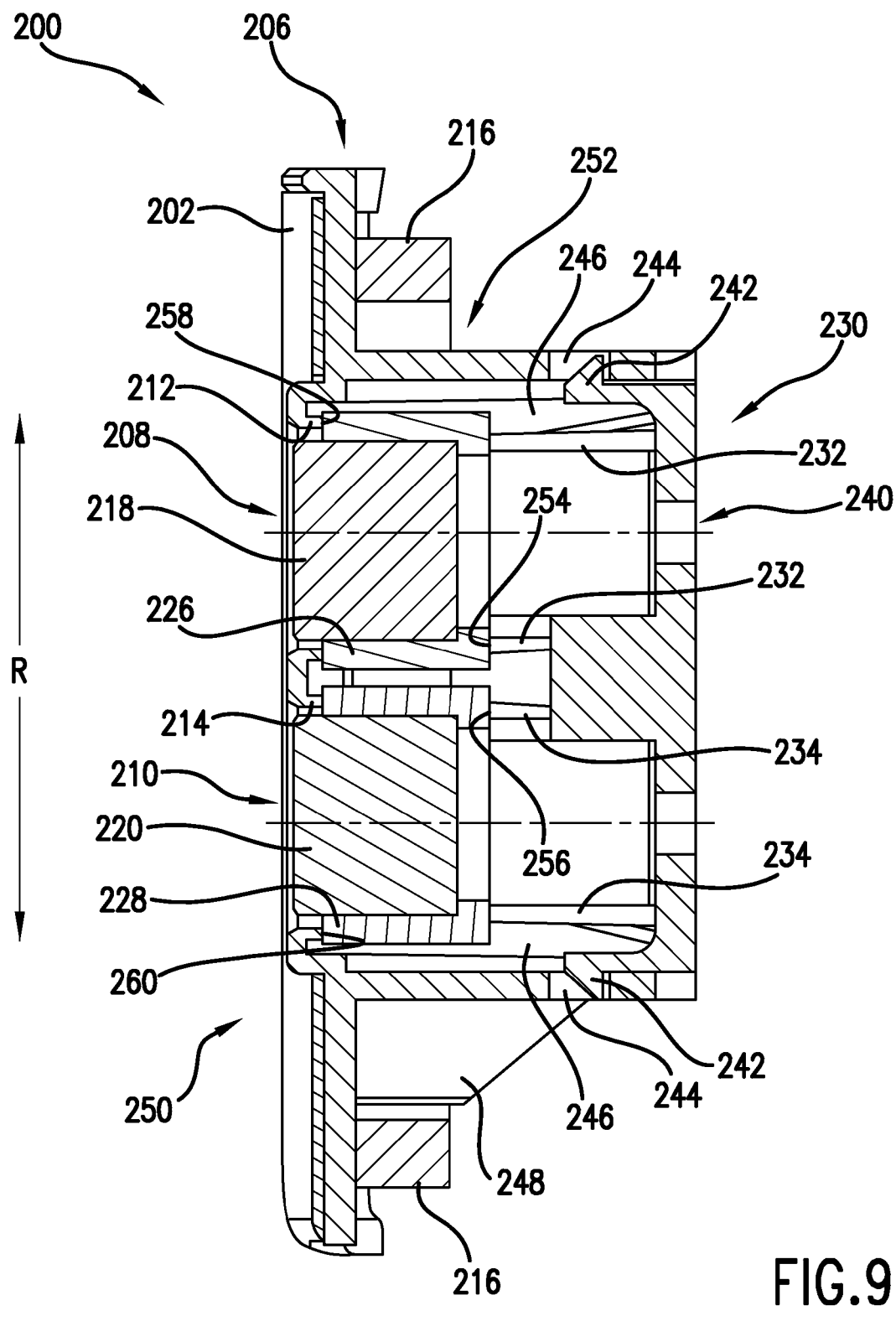
FIG. 9 provides a cross-sectional side view of an exemplary embodiment of a sensor assembly of the present disclosure.

FIGS. 8 and 9 provide an exploded perspective view and a cross-sectional side view, respectively, of an exemplary embodiment of sensor assembly 200. As previously discussed above, sensor assembly 200 includes base plate 206 and support plate 230 attached to back side 252 of base plate 206, wherein portions of each support first sensor assembly 218 and second sensor assembly 220.

As shown, first sensor assembly 222 includes a first sensor 218 and a first isolation boot 226, and second sensor assembly 224 similarly includes a second sensor 220 and a second isolation boot 228. Additionally, a portion of first sensor 218 is positioned within first isolation boot 226 and a portion of second sensor 220 is positioned within second isolation boot 228. In other exemplary embodiments, however, all of first sensor 218 may be positioned within first isolation boot 226, or a minimal amount of first sensor 218 may be positioned within first isolation boot 226. Similarly, all of second sensor 220 may be positioned within first isolation boot 228, a minimal amount of second sensor 220 may be positioned within second isolation boot 230.

It should be appreciated that although first and second isolation boots 226, 228 are shown as two separate parts, in an alternative exemplary embodiment, first and second isolation boots 226, 228, can be components of an integral piece. in such an embodiment, the portion within which the first sensor 218 is positioned would be the first isolation boot 226 and the portion within which the second sensor 22.0 is positioned would be the second isolation hoot 228.

First sensor 218 and second sensor 220 are ultrasonic sensors. In one exemplary embodiment, first sensor 218 is an ultrasonic sensor, such as an ultrasonic transducer, that is configured for sending out an ultrasonic signal. Additionally, second sensor 220 is an ultrasonic sensor, such as an ultrasonic detector, that is configured for receiving and/or sensing an ultrasonic signal. For this exemplary embodiment, first sensor 218 may be used in conjunction with second sensor 220 to sense the proximity of one or more objects. However, with such a configuration, first sensor 218 may generate vibrations when sending out ultrasonic signals. In order to prevent or minimize the transmission of these signals or vibrations through base plate 206, support plate 230, or both, first isolation boot 226 is supported in sensor assembly 200 between first base plate rib 212 and first support plate rib 232. Sensor 218 is otherwise isolated from contact with base plate 206 and support plate 230. Similarly, second isolation boot 228 is supported in sensor assembly 200 between second base plate rib 214 and second support plate rib 234, such that sensor 220 is otherwise isolated from contact with base plate 206 and support plate 230. First and second isolation boots 226, 228 therefore contact only first and second base plate ribs 212, 214, respectively, and first and second support plate ribs 232, 234, respectively.

The above configuration assists in isolating the vibrations generated by first sensor 218 or second sensor 220, such that they do not travel through either support plate 230 or base plate 206 to second sensor 220 or first sensor 218. Notably, first support plate rib 232 has a shape that is complementary with first isolation boot 226, and second support plate rib 234 has a shape that is complementary with second isolation boot 228. For example, in one exemplary embodiment, first and second support plate ribs 232, 234 have a circular cross-sectional shape in radial direction R.

Referring still to the exemplary embodiment of FIGS. 8 and 9, first support plate rib 218 and second support plate rib 220 each comprise a plurality of ribs, each defining a space 262, 264 between each adjacent rib. This configuration will further isolate any vibrations generated by first sensor 218 or second sensor 220. First isolation boot 226 is positioned against first base plate rib 212, which forms a continuous concentric circle with first aperture 208 in base plate 206. Similarly, second isolation boot 228 is positioned against second base plate rib 214, which forms a continuous concentric circle with second aperture 210 in base plate 206. In this configuration, isolation boots 226 and 228 for fluid seals between first and second sensors 218, 220 and base plate 206. In other exemplary embodiments, however, first base plate rib 212, second base plate rib 214, or both comprise a plurality of ribs (see FIG. 6).

With continuing reference to the exemplary embodiment shown in FIGS. 8 and 9, first isolation boot 226 and second isolation boot 228 are comprised of a resilient material, such as a natural or synthetic rubber. First and second isolation boots 226, 228 of this configuration may further absorb vibrations from first and/or second sensors 218, 220 and further assist in the isolation of one sensor from the other.

In order to ensure first and second sensor assemblies 222, 224 stay in position relative to base plate 206 and support plate 230 throughout the operation of sensor assembly 200, first and second plurality of nubs 236, 238 are provided. The first plurality of nubs 236 extends from distal end 254 of first support plate rib 232, and the second plurality of nubs 238 extends from distal end 256 of second support plate rib 234. In other exemplary embodiments, however, first and second plurality of nubs 236, 238 may alternatively or in addition extend from first and second base plate ribs 212, 214 (see FIG. 6). In either exemplary embodiment, when first and second isolation boots 226, 228 are supported between first and second base plate ribs 212, 214 and first and second support plate ribs 232 234, first and second isolation boots 226, 228 deform around the first and second plurality of nubs 236, 238.

In another exemplary embodiment, however, first and second isolation boots 226, 228 each contain a plurality of holes, wherein the plurality of holes in first isolation boot 226 corresponds in size, position, and number to the first plurality of nubs 236, and the plurality of holes in second isolation boot 228 corresponds in size, position, and number to the second plurality of nubs 238. Further, the first plurality of nubs 236 fit into the plurality of holes in first isolation boot 226, and the second plurality of nubs 238 fit into the plurality of holes in second isolation boot 228. This configuration prevents movement of first and second sensor assemblies 222, 224 relative to base plate 206 and support plate 230 throughout the operation of sensor assembly 200.

As is also shown in FIGS. 8 and 9, base plate 206 includes a plurality of guidance structures 246. Guidance structures 246 function to ensure first sensor assembly 222 and second sensor assembly 224 are correctly positioned between base plate 206 and support plate 230 during the assembly of sensor assembly 200. However, once support plate 230 is attached to base plate 206, guidance structures 246 have no further contact with first and second sensor assemblies 222, 224. As is more clearly shown in FIG. 5, first and second base plate ribs 212, 214 are positioned radially inward from guidance structures 246.

Support plate 230 is mounted to base plate 206 by a pair of mounting structures 242 extending from the support plate 230 and a corresponding pair of mounting slots 244 in base plate 206. Mounting structures 242 deform in radial direction R while support plate 230 is being attached to base plate 206, then snap into mounting slots 244 once support plate 230 is in the correct position. Additionally, support plate 230 includes one or more support plate alignment structures 266. Support plate alignment structures 266 function to ensure support plate 230 is in the proper position relative to base plate 206 when attached to base plate 206.

Sensor assembly 200 also includes gasket 216. Gasket 216 functions to provide a fluid seal between a surface to which sensor assembly 200 is mounted and base plate 206. As such, gasket 216 is positioned on back side 252 of base plate 206 and may be comprised of any suitable material, such as foam or a resilient material, such as a natural or synthetic rubber. In the exemplary embodiment shown in FIG. 1, sensor assembly 200 is mounted to dispenser recess 138 of dispenser 114. In this embodiment, gasket 216 forms a fluid seal between dispenser recess 138 and base plate 206.

Lastly, sensor assembly 200 includes face plate 202. Face plate 202 mounts to base plate 206 to provide an aesthetically acceptable appearance for sensor assembly 200. Face plate 202 includes an aperture 204 so as to accommodate first sensor 218 and second sensor 220.

Using the teaching disclosed herein, one of skill in the art will understand that in alternative embodiments of the present disclosure, sensor assembly 200 may have other configurations and can be used for many other applications. Specifically, the present disclosure contemplates alternative exemplary embodiments of sensor assembly 200 that doesn't include guidance structures 246, that attaches support plate 230 to base plate 206 by another suitable means, that doesn't include support plate alignment structures 266, and that doesn't include gasket 236 or face plate 202. Additionally, sensor assembly 200 is not simply limited to use within dispenser recess 138 of dispenser 114 in refrigerator 100. Sensor assembly 200 may be used in any situation where relatively close proximity detection of one or more objects is required.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A sensor assembly, comprising:
 a base plate defining:
  a first aperture, and a first base plate rib surrounding and concentric with the first aperture,
  a second aperture and a second base plate rib surrounding and concentric with the second aperture, and
  a plurality of guidance structures positioned radially outward from the first base plate rib and the second base plate rib;
 a support plate attached to said base plate, said support plate comprising:
  a first support plate rib extending in an axial direction from the support plate, and
  a second support plate rib extending in the axial direction from the support plate;
 a first sensor assembly comprising a first sensor and a first isolation boot, wherein at least a portion of the first sensor is positioned within the first isolation boot, the first isolation boot supported between the first base plate rib and the first support plate rib such that the first sensor is isolated from contact with said base plate and said support plate and said plurality of guidance structures configured to minimize the first sensor vibrations transmitted through said base plate and said support plate; and
 a second sensor assembly positioned adjacent to said first sensor assembly and comprising a second sensor and a second isolation boot, wherein at least a portion of the second sensor is positioned within the second isolation boot, the second isolation boot supported between the second base plate rib and the second support plate rib such that the second sensor is isolated from contact with said base plate and said support plate and said plurality of guidance structures configured to minimize the second sensor vibrations transmitted through said base plate and said support plate.

2. A sensor assembly as in claim 1, further comprising
a first plurality of nubs, wherein each of said first plurality of nubs extends from a distal end of the first support plate rib or from a distal end of the first base plate rib; and
a second plurality of nubs, wherein each of said second plurality of nubs extends from a distal end of the second support plate rib or from a distal end of the second base plate rib.

3. A sensor assembly as in claim 2, wherein the first isolation boot of said first sensor and the second isolation boot of said second sensor are comprised of a resilient material and each deform around said first and second plurality of nubs when said support plate is attached to said base plate.

4. A sensor assembly as in claim 2, wherein the first isolation boot of said first sensor and the second isolation boot of said second sensor are comprised of a resilient material, and each comprise a plurality of holes corresponding in size, number, and position to said first and second plurality of nubs, such that each nub in said first and second plurality of nubs fits into the plurality of holes when said support plate is attached to said base plate.

5. A sensor assembly as in claim 1, wherein the first support plate rib of said support plate comprises a plurality of ribs extending in the axial direction, each defining a space in between each adjacent rib, and wherein the second support plate rib of said support plate comprises a plurality of ribs extending in the axial direction, each defining a space in between each adjacent rib.

6. A sensor assembly as in claim 1, wherein the first base plate rib of said base plate forms a concentric circle with the first aperture in said base plate, and wherein the second base plate rib of said base plate forms a concentric circle with the second aperture in said base plate.

7. A sensor assembly as in claim 1, wherein said first sensor and said second sensor are ultrasonic sensors, and wherein said first sensor sends an ultrasonic signal and said second sensor detects an ultrasonic signal.

8. A sensor assembly as in claim 1, wherein said support plate is attached to said base plate using a mounting structure extending from said support plate in the axial direction and a mounting slot positioned in said base plate.

9. A sensor assembly as in claim 1, wherein the first isolation boot of said first sensor and the second isolation boot of said second sensor are comprised of a resilient material.

10. A sensor assembly as in claim 1, further comprising a gasket positioned adjacent to a back side of said base plate, a face plate positioned adjacent to a front side of said base plate, or both.

11. A sensor assembly for use in a refrigerator appliance, comprising:
a base plate defining:
a first aperture and a first base plate rib surrounding and concentric with the first aperture,
a second aperture and a second base plate rib surrounding and concentric with the second aperture, and
a plurality of guidance structures positioned radially outward from the first base plate rib and the second base plate rib;
a support plate attached to said base plate, said support plate comprising:
a first support plate rib extending in an axial direction from the support plate, and
a second support plate rib extending in the axial direction from the support plate;
a first sensor assembly comprising a first sensor and a first isolation boot, wherein at least a portion of the first sensor is positioned within the first isolation boot, the first isolation boot supported between the first base plate rib and the first support plate rib such that the first sensor is isolated from contact with said base plate and said support plate and said plurality of guidance structures configured to minimize the first sensor vibrations transmitted through said base plate and said support plate; and
a second sensor assembly positioned adjacent to said first sensor assembly and comprising a second sensor and a second isolation boot, wherein at least a portion of the second sensor is positioned within the second isolation boot, the second isolation boot supported between the second base plate rib and the second support plate rib such that the second sensor is isolated from contact with said base plate and said support plate and said plurality of guidance structures configured to minimize the second sensor vibrations transmitted through said base plate and said support plate.

12. A sensor assembly as in claim 11, further comprising
a first plurality of nubs, wherein each of said first plurality of nubs extends from a distal end of the first support plate rib or from a distal end of the first base plate rib; and
a second plurality of nubs, wherein each of said second plurality of nubs extends from a distal end of the second support plate rib or from a distal end of the second base plate rib.

13. A sensor assembly for use in a refrigerator appliance as in claim 12, wherein the first isolation boot of said first sensor and the second isolation boot of said second sensor are comprised of a resilient material and each deform around said first and second plurality of nubs when said support plate is attached to said base plate.

14. A sensor assembly for use in a refrigerator appliance as in claim 12, wherein the first isolation boot of said first sensor and the second isolation boot of said second sensor are comprised of a resilient material, and each comprise a plurality of holes corresponding in size, number, and position to said first and second plurality of nubs, such that each nub in said first and second plurality of nubs fits into the plurality of holes when said support plate is attached to said base plate.

15. A sensor assembly for use in a refrigerator appliance as in claim 11, wherein the first support plate rib of said support plate comprises a plurality of ribs extending in the axial direction, each defining a space in between each adjacent rib, and wherein the second support plate rib of said support plate comprises a plurality of ribs extending in the axial direction, each defining a space in between each adjacent rib.

16. A sensor assembly for use in a refrigerator appliance as in claim 11, wherein the first base plate rib of said base plate forms a concentric circle with the first aperture in said base plate, and wherein the second base plate rib of said base plate forms a concentric circle with the second aperture in said base plate.

17. A sensor assembly for use in a refrigerator appliance as in claim 11, wherein said first sensor and said second sensor are ultrasonic sensors, and wherein said first sensor sends an ultrasonic signal and said second sensor detects an ultrasonic signal.

18. A sensor assembly for use in a refrigerator appliance as in claim 11, wherein the first isolation boot of said first sensor and the second isolation boot of said second sensor are comprised of a resilient material.

19. A sensor assembly for use in a refrigerator appliance as in claim 11, further comprising a gasket positioned adjacent to a back side of said base plate, wherein the sensor assembly is mounted to a surface of the refrigerator appliance such that said base plate and said gasket form a fluid seal with the surface of the refrigerator appliance.

20. A sensor assembly for use in a refrigerator appliance as in claim 11, further comprising a face plate positioned adjacent to a front side of said base plate.

* * * * *